United States Patent Office 2,962,763
Patented Dec. 6, 1960

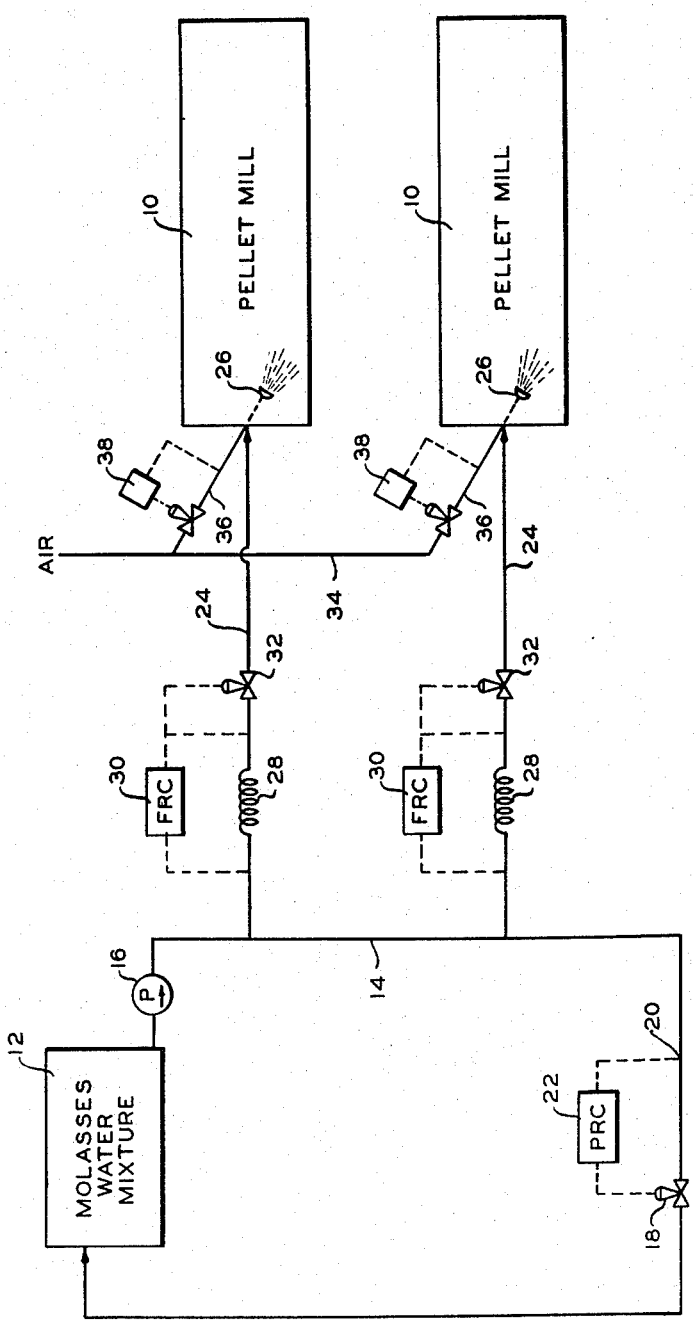

2,962,763

PELLETING OF CARBON BLACK

Edgar W. Brasch, Jr., Borger, Tex., assignor to Phillips Petroleum Company, a corporation of Delaware Filed Aug. 5, 1957, Ser. No. 676,089

9 Claims. (Cl. 18—48)

This invention relates to a method and apparatus for pelleting carbon black wherein a liquid is sprayed onto the black during pelleting.

The co-pending application of Oliver K. Austin, Serial No. 386,585, filed October 16, 1953, entitled "Water Spray in Pellet Mills," discloses and claims a process for pelleting hot flocculent carbon black in which a stream of water is sprayed into the pelleting mill onto the bed of pellets therein while tumbling the black and pellets. Said application is based upon the discovery that the spraying of water into the mill during pelleting cools the pellets to a temperature such that the pellets passing from the mill can be handled on the product belts without causing deterioration of the belts and further that the water spray improves the pelleting process and produces an effluent pellet stream with a lower concentration of dust and also improves the strength of the pellets.

It has been found that the incorporation of molasses into the water sprayed onto the pellet bed improves the quality of the pellets in that they are stronger and less subject to attrition and dusting than pellets prepared without the inclusion of molasses in the spray. However, incorporating molasses in the spray complicates the spraying problem in that it is more difficult to spray the aqueous solution of molasses at uniform rates onto the pellet bed in the mill due to the tendency of plugging of the lines and spraying system and the higher viscosity of the solution.

Several methods of spraying an aqueous solution of molasses onto a bed of pellets in a pelleting mill or system of mills have been attempted without commercial success. In one method equal parts of molasses and water were mixed and the solution was pumped thru a recirculation line whereby constant pressure was maintained on the discharge side of the circulation pump. A stream of solution was removed from this constant pressure recirculation solution and passed thru a small coil which served as an orifice. A flow recorder-controller was connected to the recirculation line upstream from the coil and to a motor valve downstream from the coil. This flow recorder-controller maintained a constant flow of solution thru the coil. Water under pressure was introduced into the spray line downstream of the motor valve and the water pressure was maintained constant. A separate line downstream from the motor valve was connected to each spray in a series of six pellet mills. The liquid in each spray line to the individual pellet mills flowed thru a rotameter and needle valve and then into the mill. The needle valves were adjusted to provide a given rate thru the rotameters. It was found that a constant rate of flow could not be maintained by this method and apparatus.

Another system was tested which included recirculating a stream of solution under constant pressure as described in the previous paragraph. A side stream from the recirculating stream was passed thru a small diameter coil. A ratio controller was connected to the downstream and upstream sides of the coil and also to a motor valve on the downstream side of the coil. Water was added to the molasses solution downstream from the motor valve. The water line was connected to a flow transmitter. The flow transmitter was connected to the ratio controller for maintaining a constant ratio of water to molasses solution. The diluted molasses stream was fed through a rotameter and a needle valve into a pellet mill as described in the above paragraph. The rate of flow could not be maintained constant.

The present invention was devised for feeding an aqueous solution of molasses or other difficulty controllable streams at a constant rate of flow thru a spray system such as the sprays in a series of pellet mills.

Accordingly, it is an object of the invention to provide an improved process and apparatus for spraying a difficultly sprayable liquid into a spraying area at a constant rate. Another object of the invention is to provide an improved process and apparatus for pelleting carbon black. A further object is to provide a method and apparatus for feeding a liquid such as an aqueous solution of molasses at a constant rate to spray nozzles or heads in a spraying area. It is also an object of the invention to provide an improved process and apparatus for uniformly spraying a material to be sprayed. Other objects of the invention will become apparent from a consideration of the accompanying disclosure.

The invention may best be understood by referenec to the accompanying schematic drawing which is a plan view showing the arrangement of apparatus and flow of the process. A series of cylindrical pellet mills 10 are positioned so as to rotate on their horizontal axes by means not shown. Loose flocculent hot carbon black is fed into the left end of the mills and effluent pellets are recovered from the right end of the mills. The details of the carbon black feeding system and pellet recovery system are not shown as this equipment is conventional in the art. The spray system for the mills comprises a reservoir 12 to which is connected at different sections a recirculation line 14 in which is positioned a pump 16 and a pressure control system. This pressure control system comprises a motor valve 18, a pressure sensing device 20, and a pressure recorder-controller 22 connected with element 20. The pressure controller 22 is responsive to the pressure sensed by device 20 and is set to maintain a predetermined perssure by operating motor valve 18 to control the flow therethru and hence the pressure intermediate pump 16 and the motor valve. Individual feed lines 24 connect recirculation line 14 with sprays 26 in each individual pellet mill. In each spray line 24 there is positioned a section of tubing in the form of a coil 28 which is of substantially smaller internal diameter than the line on each side of the coil whereby the coil serves as a choke or orifice. A flow recorder-controller 30 is sensitive to the flow thru the coil and is set to maintain a desired flow rate by controlling motor valve 32.

In order to facilitate the spraying and assist in preventing plugging of the spray nozzles, an air line 34 is connected with each of the sprays by individual lines 36. A pressure regulator 38 is installed in line 36 so as to control the air pressure at a predetermined value as it enters the spray system.

To illustrate the invention and utilization of the apparatus, the following example is presented.

*Example*

One volume of molasses was diluted with four volumes of water and this solution was pumped thru a recirculation line, such as 14, connected with reservoir 12 and the pressure in the line was maintained substantially constant at 40 p.s.i.g. by the pressure control system described. Separate streams of the solution of molasses were taken off the recirculation line and fed to individual pellet mills 6' in diameter and 48' long thru the system shown and described. The internal diameter of line 24 was about .36", while coil 28 was 7'6" length of ¼" copper tubing having an internal diameter of about .23". The rate of flow of carbon black to each mill was in the range of 500 to 600 pounds per hour and the flow rate of molasses solution was maintained constant at 2.7 gallons per hour. A Gould centrifugal pump, having a rating of 20 gallons per min. at 100 p.s.i.g., was utilized in line 14 and the pressure controller maintained a pressure of 40 p.s.i.g. in line 14 intermediate the pump and the control. The air pressure in lines 36 was maintained at 5 p.s.i.g. and the rate was just below one cubic foot per minute to each mill. The air introduction assisted materially in atomizing the solution as it was sprayed into the pellet mill.

During operation in the manner described, the flow rate was kept constant and spraying was uniform. It has been found necessary to have a flow rate-controller on each line thru which molasses solution passes to the mill. It has also been found that where ordinary orifices in lines 24 plug and prevent adequate control of the molasses streams to the mills the use of coils or tubing of restricted cross section is very satisfactory for controlling the flow rate. The spray control system described herein has been utilized for an extended period in a number of pelleting mills and has worked very satisfactorily in commercial operation.

It is to be understood that certain variations may be made in the process described. The concentration of the molasses in the aqueous solution may be varied over a wide range such as 2 to 60 volume percent, preferably the range of 5 to 50 volume percent, of the solution and the rate of flow of aqueous solution can be varied within the range of about 2 to 24 pounds per 100 pounds of black. Because of the temperature of the black in the mill which varies in the range of about 200 to 300° F. rapid evaporation occurs and the pellets contain less than 1% of moisture when they are recovered from the mill, no special drying thereof being required. The pressure in the recirculation line can be varied in the range of 30 to 100 p.s.i.g. but 40 p.s.i.g. has been found very satisfactory. The equipment and apparatus described has been used with a solution containing 50% molasses by volume and with pure water without revision or modification and can be utilized with even higher concentration of molasses. Flow rates of solution in the individual spray lines may be readily changed and controlled by changing the length and/or diameter of the coil or copper tubing in the individual spray lines.

The cross-sectional area of the line in which the copper tubing is placed should be at least twice and, preferably, at least 4 times as large as the cross-sectional area of the copper tubing.

Certain modifications of the invention will become apparent to those skilled in the art and the illustrative details disclosed are not to be construed as imposing unnecessary limitations on the invention.

I claim:

1. Apparatus for spraying a liquid into a spraying area comprising a reservoir for said liquid; a recirculation line from one section to another of said reservoir; a pump in said line; a pressure controller downstream of said pump adapted to maintain a constant pressure in said line between said pump and said controller; at least one conduit leading from said line intermediate said controller and said pump having a spray nozzle on its downstream end; a section of tubing in said conduit of substantial length and of smaller diameter than said conduit, having the effect of an orifice therein; a flow control valve in said conduit downstream of said tubing; a flow rate controller connected with said conduit upstream and downstream of said tubing and operatively connected with said flow control valve.

2. The apparatus of claim 1 including a gas line connected with said conduit downstream of said flow control valve having means therein for maintaining constant pressure.

3. The apparatus of claim 1 wherein said section of tubing is ¼" copper tubing 6' to 15' long and the adjacent line is at least ¼" inside diameter.

4. A process for spraying an aqueous solution of molasses onto a bed of pellets in a pelleting mill which comprises maintaining the concentration of molasses in said solution in the range of 2 to 60 percent by volume; maintaining a circulation of said solution thru a line at a predetermined constant pressure in the range of 30 to 100 p.s.i.g.; withdrawing a stream from an intermediate section of said line; passing said stream thru a flow control zone of restricted cross sectional area at a constant flow rate to a spray directed toward said bed of pellets; and spraying said solution onto said bed.

5. The process of claim 4 including the step of passing a gas at a constant pressure thru said spray along with said liquid.

6. A process for pelleting carbon black which comprises passing dry flocculent black to a rotating tumbling zone so as to form therein a bed of pellets containing a minor amount of loose black; circulating an aqueous solution of molasses thru a line maintained under substantially constant pressure in the range of 30 to 100 p.s.i.g., the concentration of said molasses being in the range of 5 to 50 percent by volume of said solution; withdrawing a stream from an intermediate section of said line; passing said stream thru a flow control zone comprising a length of tubing of smaller cross section than the adjacent stream at a constant rate to a spray positioned to deliver solution to said bed; and spraying said solution onto said bed.

7. The process of claim 6 wherein air at a pressure in the range of 4 to 6 p.s.i.g. is passed thru said spray with said solution.

8. A process for pelleting carbon black which comprises feeding hot dry flocculent carbon black at a rate in the range of 500 to 1200 pounds per hour to one end section of an elongated cylindrical drum rotating with its axis horizontal so as to form and maintain a bed of pellets in said drum; maintaining circulation of an aqueous solution of molasses of 5 to 50 volume percent molasses thru a line at a predetermined constant pressure in the range of 30 to 100 p.s.i.g.; withdrawing a stream of solution from said line at a rate in the range of 1.5 to 5 gallons per hour; passing said stream thru a flow control zone comprising a length of tubing of smaller cross section than the adjacent stream at a constant flow rate to a spray inside of said drum; spraying said stream onto the pellets in said drum whereby molasses is deposited on said pellets to strengthen same and the major portion of the water sprayed onto the pellets is evaporated by the heat of the carbon black; and withdrawing pellets from the opposite end of said drum.

9. The process of claim 8 including separately feeding said hot carbon black to each of several drums at said rate; withdrawing a stream of solution for each drum; and passing each stream thru a separate said flow control zone at said constant rate to a spray in a separate one of said drums.

References Cited in the file of this patent

UNITED STATES PATENTS

| | | |
|---|---|---|
| 2,022,481 | Schellenger | Nov. 26, 1935 |
| 2,054,164 | Richards | June 23, 1936 |
| 2,457,962 | Whaley | Jan. 4, 1949 |
| 2,457,963 | Thodos | Jan. 4, 1949 |
| 2,537,681 | Lawrence | Jan. 9, 1951 |
| 2,556,517 | Broussard | June 12, 1951 |
| 2,669,482 | Gold et al. | Feb. 6, 1954 |
| 2,758,039 | Barbour | Aug. 17, 1956 |
| 2,766,070 | Park | Oct. 9, 1956 |
| 2,850,403 | Day | Sept. 2, 1958 |

FOREIGN PATENTS

| | | |
|---|---|---|
| 775,378 | Great Britain | May 22, 1957 |